UNITED STATES PATENT OFFICE.

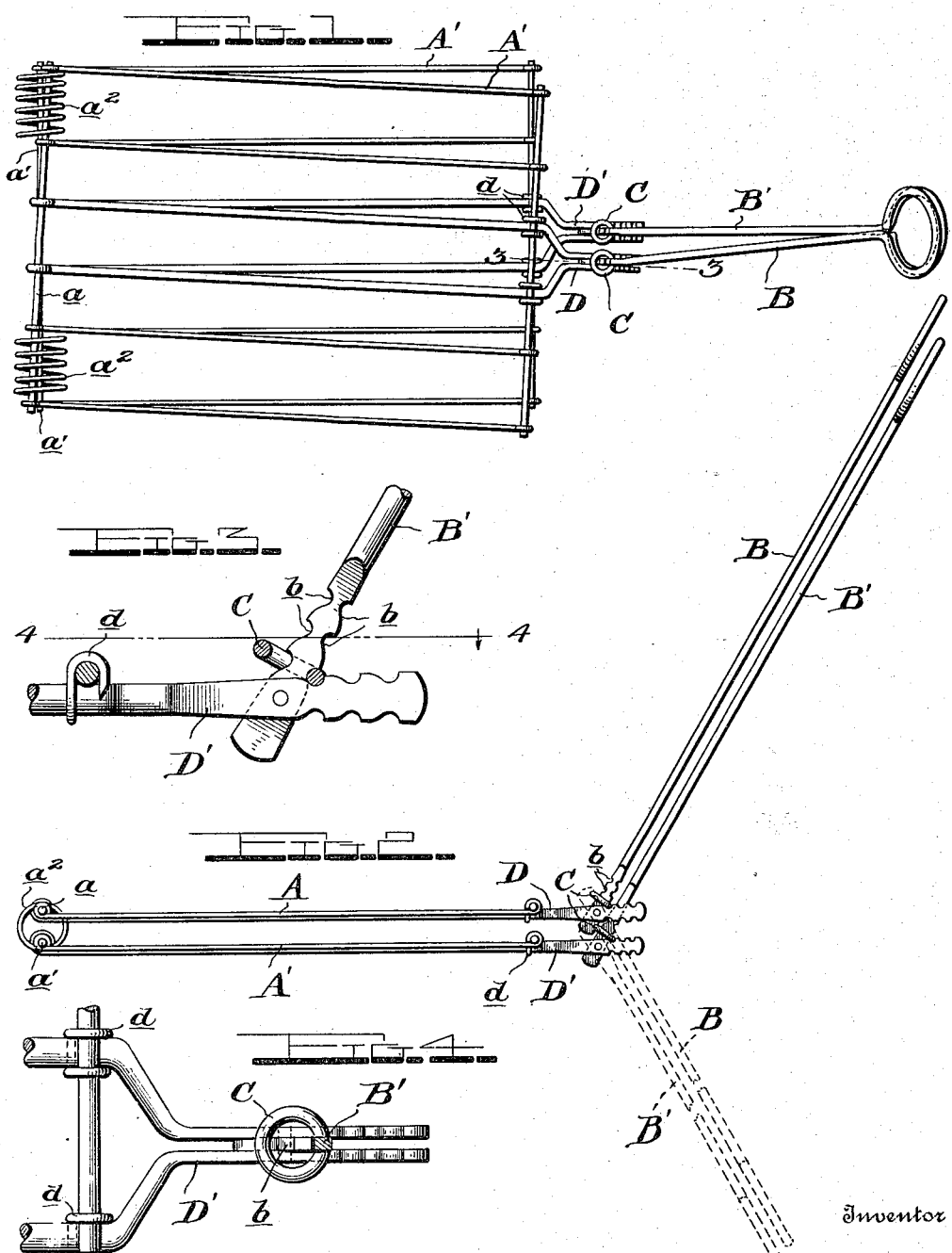

DAVID ROSE, OF LANCASTER, PENNSYLVANIA.

TOASTER.

1,155,838.        Specification of Letters Patent.        Patented Oct. 5, 1915.

Application filed January 16, 1915. Serial No. 2,541.

*To all whom it may concern:*

Be it known that I, DAVID ROSE, a citizen of the United States, residing at Lancaster, in the county of Lancaster and State of Pennsylvania, have invented certain new and useful Improvements in Toasters; and I hereby declare that the following is a full, clear, and exact description thereof, reference being had to the accompanying drawings, which form part of this specification.

This invention relates to devices for toasting bread and the like.

The objects of the invention are to provide an improved device of the character referred to comprising grated members having a handle pivoted thereto, together with means for securing said handle in a fixed position relatively to said members, and at different angles thereto, so that the grated members may be conveniently held in a horizontal position with the handle extending therefrom at an angle thereto, or in an upwardly inclined position upon either side, to adapt the device to be conveniently manipulated and sustained in the desired position over the fire, or in an oven, without danger of burning or toasting the bread or other food unevenly, as is frequently the case with toasters or broilers as ordinarily constructed.

The invention will first be hereinafter more particularly described, with reference to the accompanying drawings, which form a part of this specification, and then pointed out in the claims at the end of the description.

In said drawings: Figure 1 represents a top plan view of a toaster or broiler embodying my invention. Fig. 2 is a side elevation of the same showing the toaster in a horizontal position with the handle inclined upwardly therefrom and indicating in dotted lines a reverse position of the handle, adapting the toaster to be turned over for toasting or broiling the food on opposite sides; Fig. 3 is a detail sectional view, on a slightly enlarged scale; the section being taken on line 3—3 of Fig. 1, and Fig. 4 is an enlarged detail plan view of a broken-away portion of one member of the toaster and of the handle member secured thereto, illustrating the interlocking connection between the grated and handle members.

Referring to said drawings, in which the same reference letters are used to denote corresponding parts in different views, the toaster or broiler may consist of two grated members $A$ and $A^1$, preferably of rectangular form and hinged together at one edge, for example, at the rear end thereof, a convenient form of hinge comprising a wire $a^2$ at each side of the toaster coiled around cross-bars $a$ and $a^1$ at the rear end of the toaster, so that said cross-bars have free play within said coils to a limited extent to allow freedom of movement and separation of the two grated members sufficiently to admit between them a slice of bread or other article of food to be toasted or broiled.

The members $A$ and $A^1$ may consist of a series of metal rods or bars connected at their opposite ends by suitable cross-bars or rods around which the ends of the longitudinal rods are coiled, as shown, two of the intermediate rods being preferably extended beyond the front cross-bar and bent inwardly so as to bring them sufficiently near together to permit the shank of the handle member $B$ or $B^1$ to be pivoted between said extensions. Said handle members $B$ and $B^1$ may each consist of a metallic rod having a loop at its free end and a shank which is notched or serrated on opposite sides thereof, as at $b$, for engagement with a ring or similar device $C$ slidably fitted on said shank, so that when the handle is thrown into an upwardly inclined position with the grated members extending horizontally the two parts may be locked together. The tangs, which are denoted by the letters $D$, $D^1$, are also notched or serrated, as shown, for engagement with said sliding ring $C$ so that when the handle is thrown into the position indicated more clearly in full lines in Fig. 2, or in the dotted line position shown in said Fig. 2, when the device is turned over, the ring $C$ will engage opposed serrations or notches in the tang and shank of the handle, as shown in Fig. 3, and lock the handle in an upwardly inclined position on the grated member, in which position the toaster may be conveniently held over a fire or in an oven in a horizontal position and the bread or other food more evenly toasted than is practicable in using toasters as usually constructed with a handle extending from the grated members in the same plane. The tangs $D$ and $D^1$ are preferably integral with the intermediate bars or rods of the grated members which are conveniently secured to the front cross-bar by clips $d$, $d$, but it is obvious that such devices need not be integral with said intermediate bars but formed separately and secured thereto or to the front cross-bar for attaching the handle independently of said intermediate bars; and that instead of the rings C, a similar device of angular or rectangular form might be used for securing the handle members in different positions extending from either side of the toaster as desired in commercial or practical use.

It will also be understood that the term "notches" as used in the appended claims may include either notches or serrations or any equivalent means for effecting an interlocking engagement between the sliding rings on the handle members and the shanks or tangs of the handles and grated members.

Having thus described my invention, what I claim as new and desire to secure by Letters Patent is:

1. A toaster comprising grated members hinged together at one edge and handle members each pivoted to one of said grated members at the free edge thereof, said handle members forming a handle arranged at an angle to said grated members, and means for securing each handle member to one of said grated members at an angle from either side of the toaster.

2. A toaster comprising grated members hinged together at one edge and handle members pivoted thereto at the free edge thereof, said handle members forming a handle adapted to be arranged at different angles to said grated members extending from either side thereof, and means for securing said handle at the desired angle in a fixed position relatively to said grated members.

3. A toaster comprising grated members hinged together at one edge and each having a tang projecting from the opposite edge thereof, handle members each pivoted to one of said tangs and together forming a handle, and interlocking means on said handle members and tangs for securing said handle in a fixed position relatively to said grated members at an angle thereto.

4. A toaster comprising grated members hinged together at one edge and each having a tang projecting from the opposite edge thereof, said tangs having notches therein, handle members each pivoted to one of said tangs and together forming a handle, the shanks of said handles also having notches therein, and means for interlocking engagement with opposed notches of the handle and shank for securing the handle in a fixed position relatively to the toaster at an angle thereto.

5. A toaster comprising grated members hinged together at one edge and each having a tang projecting from the opposite edge thereof, said tangs having notches in opposite sides thereof, handle members each pivoted to one of said tangs and arranged to support the grated members at an angle thereto, the shanks of said handle members also having notches on opposite sides thereof, and means on said handles for interlocking engagement with opposed notches in said tangs and shanks for securing the handle at an angle to the grated members on either side thereof.

6. A toaster or broiler comprising two grated members each having a tang projecting from one edge thereof, each tang having a handle member pivoted thereto, said grated members being hinged together at the edge thereof opposite said tangs, said handle members each having a ring thereon adapted to engage the tang on the grated member to which it is pivoted and lock the handle in different fixed positions relatively to the grated member at an angle thereto on either side thereof.

In testimony that I claim the foregoing as my own, I affix my signature in presence of two witnesses.

DAVID ROSE.

Witnesses:
JOHN N. HETRICK,
MILLER R. BURKHART.

Copies of this patent may be obtained for five cents each, by addressing the "Commissioner of Patents, Washington, D. C."